[redacted]

United State

[11] 3,619,783

[72] Inventor Thomas H. Ritter
Lompoc, Calif.

[21] Appl. No. 77,019
[22] Filed Sept. 30, 1970
[45] Patented Nov. 9, 1971

[73] Assignee H & B Communications Corporation
Beverly Hills, Calif.

Continuation of application Ser. No. 613,249, Feb. 1, 1967, now abandoned.

[54] MEANS FOR DETERMINING TELEVISION CHANNEL USE IN A COMMUNITY ANTENNA TELEVISION SYSTEM
6 Claims, 12 Drawing Figs.

[52] U.S. Cl. .......... 325/31, 179/2 AS
[51] Int. Cl. .......... H04h 9/00
[50] Field of Search .......... 325/31, 308, 309; 179/2 AS; 178/DIG. 13

[56] References Cited
UNITED STATES PATENTS
3,048,780 8/1962 Diambre et al. .......... 325/31
3,230,302 1/1966 Bruck et al. .......... 325/31

*Primary Examiner*—Benedict V. Safourek
*Assistant Examiner*—Albert J. Mayer
*Attorney*—Karl W. Flocks

ABSTRACT: Means to determine the channel to which a subscriber on a community antenna television system is tuned utilizing various embodiments of command console and subscriber units utilizing a radio frequency carrier wave generated by the local oscillator of the subscriber's sets and receiving the information upon interrogation of the subscriber unit by the command console. Interrogation and return signals may be either modulated radio frequency signals or audio tones.

INVENTOR
THOMAS H. RITTER
BY
KARL W. FLOCKS
ATTORNEY

INVENTOR

THOMAS H. RITTER

BY KARL W. FLOCKS

ATTORNEY

INVENTOR

THOMAS H. RITTER

BY KARL W. FLOCKS

ATTORNEY

INVENTOR

THOMAS H.RITTER

BY

KARL W FLOCKS

ATTORNEY

INVENTOR
THOMAS H. RITTER
BY KARL W FLOCKS
ATTORNEY

INVENTOR

THOMAS H. RITTER

BY KARL W. FLOCKS

ATTORNEY

INVENTOR
THOMAS H. RITTER
BY KARL W. FLOCKS
ATTORNEY

MEANS FOR DETERMINING TELEVISION CHANNEL USE IN A COMMUNITY ANTENNA TELEVISION SYSTEM

This is a continuation of Ser. No. 613,249 filed Feb. 1, 1967, now abandoned.

The present invention relates to a community antenna television system and more particularly to means to determine to which television channel a customer's or subscriber's television receiver is tuned at any given time without requiring physical access to the subscriber's premises other than for the existing coaxial cable which provides the subscriber with the community antenna television signals.

With the system of the present invention, no modification to any existing subscriber equipment is required and no degradation of or interruption to the existing community antenna television services is caused by the inclusion of this system within the community antenna television operator's existing distribution plant network.

Such information as can be obtained through the system of the present invention has value in various surveys including determining popularity of programming and advertising effectiveness.

A complete understanding of the present invention may be had from the following description of some embodiments of the invention. In the description, reference is made to the accompanying drawings in which.

Figure 1:
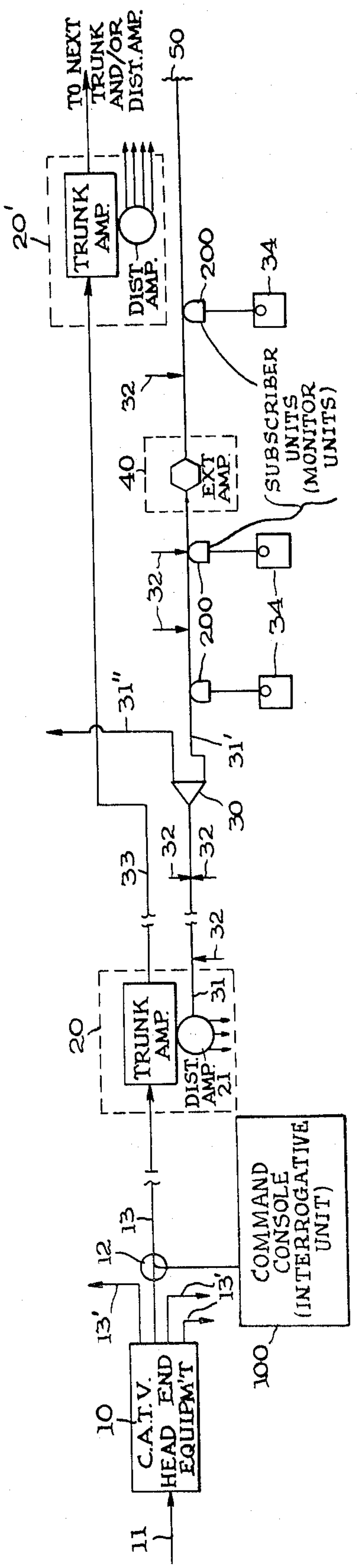
FIG. 1 is a block diagram of an overall community antenna television system incorporating the means of the present invention for determining the tuning of a subscriber's set.

The basic scheme utilizes a radio frequency carrier wave generated by and necessary to the operation of any subscriber television receiver but not necessarily peculiar to sets used by community antenna television system subscribers. This signal has a frequency which is a direct function of the television channel to which a television set is tuned and is independent of the channels available in a given area, the subscriber's television set model or make (assuming only that the set is operable to such an extent as to allow normal viewing), or any other factor within the subscriber's control, and thus is a direct, repeatable, predictable indication of the channel to which the subscriber's television set is tuned.

All consumer type television receivers in current use in this country are of the "superheterodyne" type, meaning that each employs an integral, tunable, source of single frequency (spectrally pure—unmodulated) radio frequency waves, called a "local oscillator" which is combined with the desired, radiated received radio frequency (RF) carrier wave which conveys the information of the television signals to produce a third radio frequency, commonly known as the "intermediate frequency" or "IF" signal which is amplified further by a fixed tuned band-passed radio frequency amplifier known as an IF Amplifier before being separated into picture (video) signals for display and sound (audio) signals to operate the loudspeaker of the television receiver.

Technical and economic factors have caused a standardization of the Intermediate Frequency (IF) amplifier's operating frequency in consumer television receivers of foreign and domestic manufacture. These same considerations cause the frequency of the integral local oscillator, (LO), radio frequency wave generator to be placed above the incoming television radio frequency (RF) wave's frequency by a fixed amount equal to the IF frequency. Thus $f_{LO}=f_{RF}+f_{IF}$.

If $f_{LO}$ may be determined from outside a subscriber's premises, (with the IF frequency ($f_{IF}$) which is a known fixed value) the frequency of the television channel being viewed may be derived at any time from the relation $f_{RF}=f_{LO}-f_{IF}$ where $f_{IF}$ is a known frequency. The derived frequency $f_{RF}$ may be used to identify, by means of comparison with nationwide Federal Communication Commission television channel frequency allocations, the channel being viewed.

From the above, it can be seen that if the local oscillator frequency can be determined from a remote (off premises) location, the channel to which the subscriber has his set tuned may be derived by virtue of the fixed frequency relation existing between the RF, IF, and LO frequencies. This is the premise of the operation of the system described herein.

Frequency designations have been shown in the FIGURES and are discussed in the specification but this is done only to illustrate a working system based upon present Federal Communication Commission standards for VHF channels and is not to be considered limiting to the use of those frequencies but merely illustrative of an embodiment of the invention.

Referring to FIG. 1 which is a block diagram of a community antenna television system incorporating the present invention, there are shown overall system connections. Throughout the remainder of this specification the community antenna television system shall be referred to by the abbreviated form "CATV system."

This system is based on the utilization of a superhetrodyne detection receiver unit to identify the signal being radiated from the local oscillator of the customer's television set. The detection receiver unit is tuned to the proper input frequencies by tuning the frequency of the sweep local oscillator over the correct frequency range. It is possible to accomplish the same overall result of tuning the sweep local oscillator through its range by different methods. Some of these different methods require modification of the equipment configuration and elements at the command console and the customer subscriber unit. Several modifications will be discussed.

CATV head and equipment 10 which is equipment normally used in a CATV system receives a television signal 11 from the network or other sources which it passes through directional coupler 12 into trunk distribution line 13 to trunk amplifier section 20. A command console or interrogator unit 100 is connected into trunk line 13 by means of directional coupler 12 where the trunk line leaves CATV head end equipment 10. Although not shown, other command consoles may similarly be connected into other or all of the trunk lines 13' leaving CATV head end equipment 10.

From trunk amplifier section 20 connections are made to other trunk amplifier sections 20' and through a separate distribution amplifier 21 output to distribution line 31. This distribution line may or may not be divided by hybrid splitter 30 to feed two distribution lines 31' and 31'' from which tap-off connections 32 are made for customer television sets receiving television signals not monitored as well as monitored locations tapped-off from distribution line 31 through subscriber units or monitor units 200 to customer television sets 34. Long distribution lines may have one or more line extender amplifier sections 40 allowing additional lengths of distribution line with tap-off connections 32 and tapped-off connections through subscriber units 200 to permit the serving of more customers. Since all CATV distribution and trunk cables presently have a nominal impedance of 75 ohms, all lines are terminated in a matched 75 ohm resistance terminator.

Figure 9:
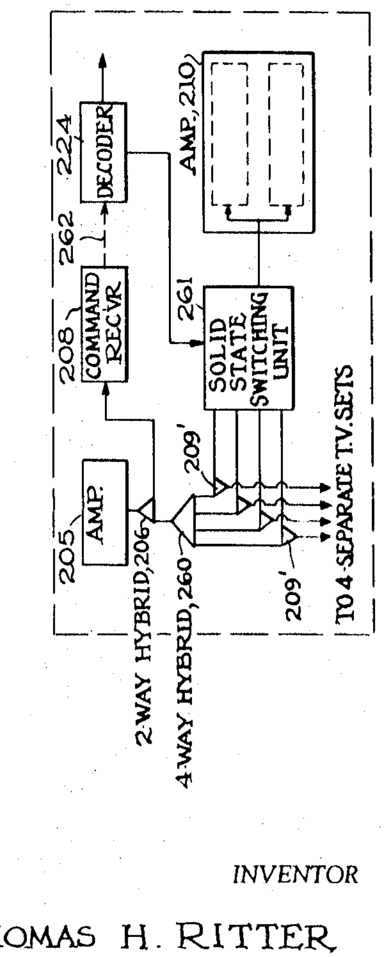
FIG. 9 is a block diagram of an adaptation to provide for multiple customer service from a single subscriber unit.
Figure 10:
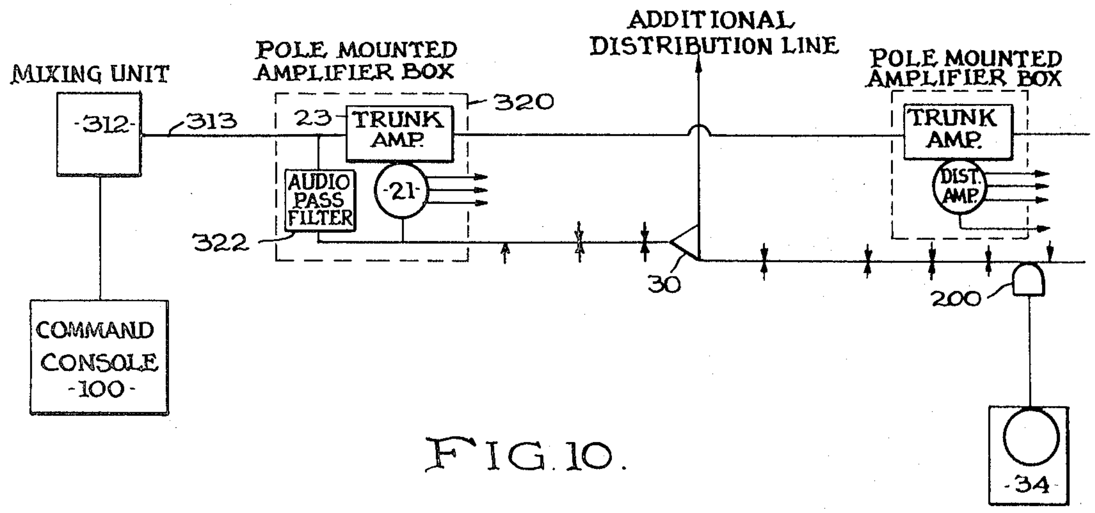
FIG. 10 is a modified portion of a block diagram of the community antenna television system for use with a third embodiment of the system of the present invention.
Figure 11:
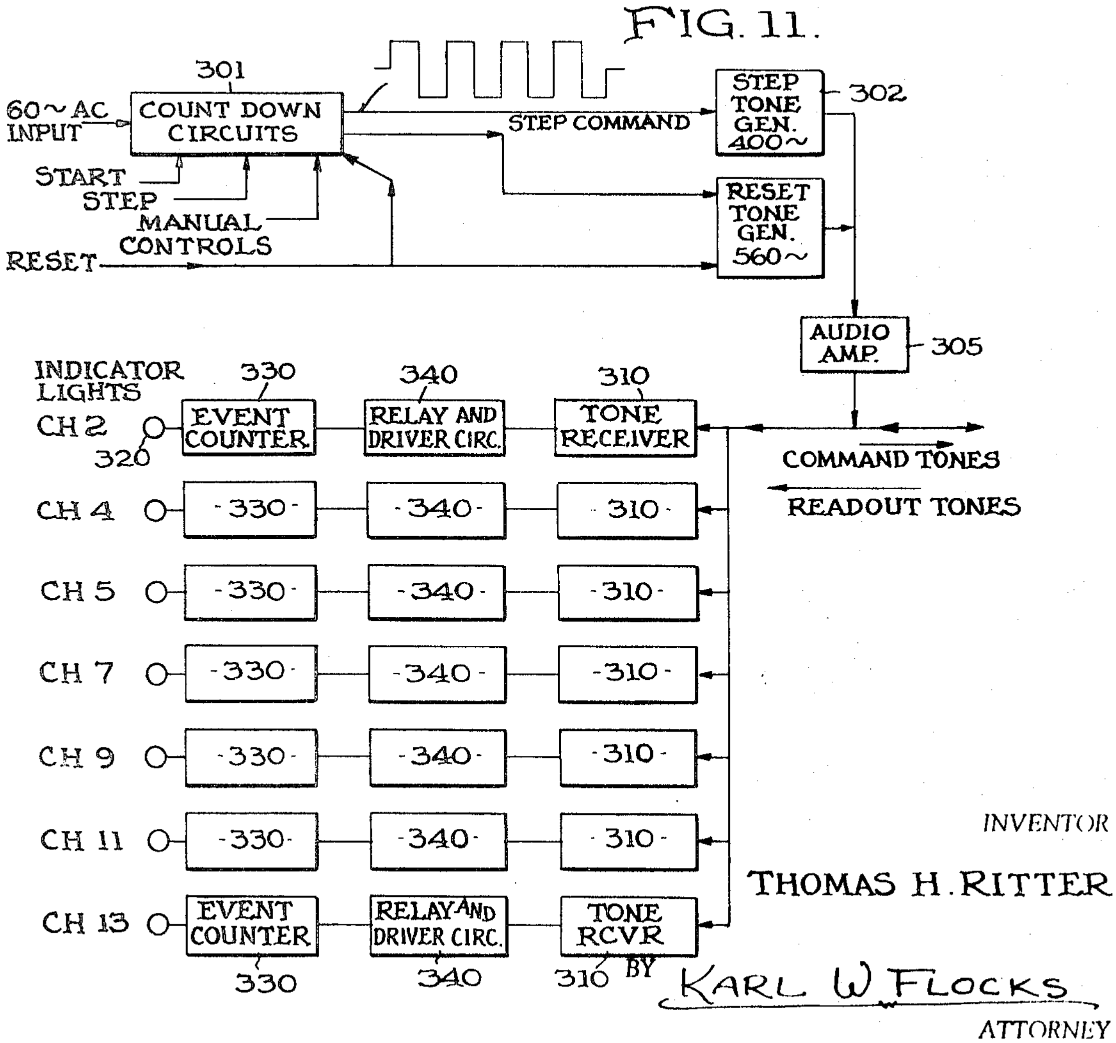
FIGS. 11 and 12 are block diagrams of third embodiments of a command console and subscriber unit portions respectively used in the system of the present invention.
Figure 12:
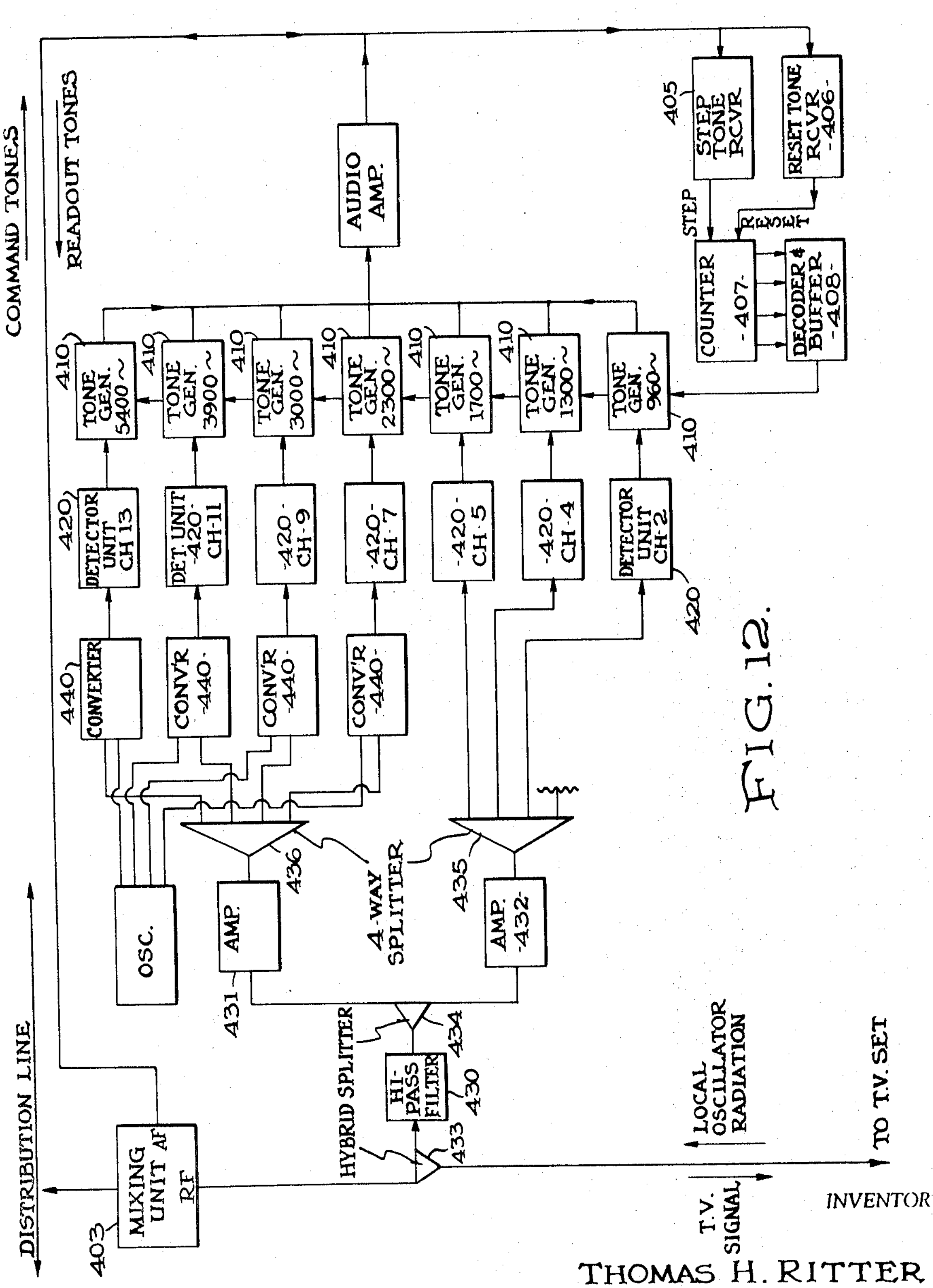

In the embodiments illustrated in FIGS. 1 through 9 the command signals from command console 100 to all subscriber units 200 to interrogate these units in turn and the return signals containing the channel information are modulated RF signals. In the embodiment of FIGS. 10 through 12 these signals are audio tones but this aspect will be discussed further in connection with those FIGURES.

Command signals as shown in the case illustrated consist of a 53 megacycle RF carrier signal, which is modulated by the various command tones. Since 53 mc. is within the band-pass of all amplifiers, splitters, directional couplers, and other components normally utilized in a CATV system, this signal can be carried throughout the entire CATV system. The signal is connected into the trunk line 13 through directional coupler 12. This command signal is mixed with the television signals and is carried through the trunk cables to all amplifier sections 20, 20' in the system. FIG. 1 shows subscriber units 200 connected to a distribution line 31' from the first trunk amplifier section 20. Each trunk amplifier section 20 or 20' amplifies the television and command signals to makeup for the loss of the trunk cable connecting it to the previous amplifier or the CATV head end equipment. These trunk amplifiers 20, 20' are utilized only to drive the signal to the next amplifier 20', and to feed a distribution amplifier 21 for serving nearby customers—if required. In all cases, customers are connected only to the output of distribution amplifiers 21—never directly from a trunk line 13 or 33. The television and command signals proceed down distribution lines 31, 31' and 31'' from the output of distribution amplifier 21 to normal CATV tap-off connections 32 and to monitored television sets 34 through subscriber units 200.

Figure 2:
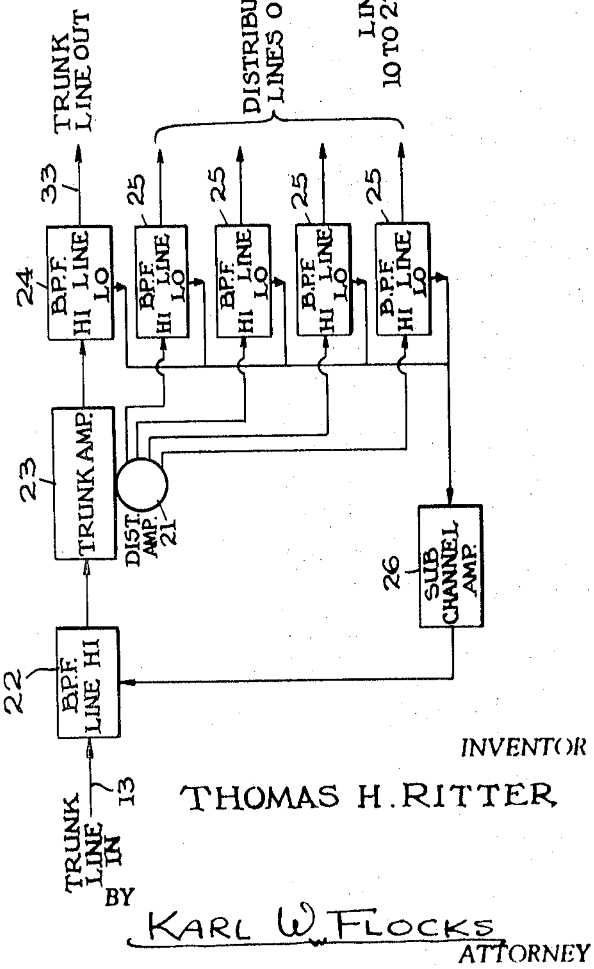
FIG. 2 is a detail block diagram of the trunk amplifier section of the system of FIG. 1.

The paths of the television signals through the trunk amplifier section 20 are shown in further detail in FIG. 2. These signals enter section 20 on trunk line 13 and pass through band-pass filter 22 to trunk amplifier 23. The form of band-pass filters 22 and the other band-pass filters 24 and 25 in the trunk amplifier section 20 is shown in the circuit diagram of FIG. 4. Marked thereon are the "LINE", "HI", and "LOW" connections which are designated in each of the blocks showing a band-pass filter in FIG. 2. From trunk amplifier 23, the television and command signals pass both through band-pass filter 24 to trunk line 33 to additional truck amplifier sections 20', and to distribution amplifier 21 or other distribution amplifiers not shown. Each of the outputs from distribution amplifier 21 then passes through a band-pass filter 25 to distribution lines and both monitored and unmonitored locations of television sets.

Figure 3:
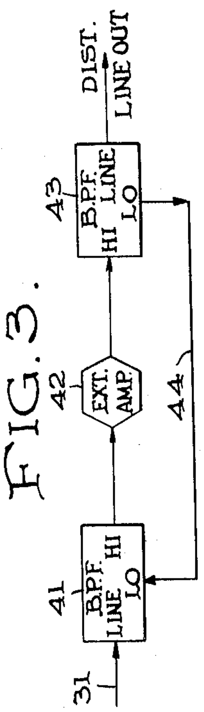
FIG. 3 is a detail block diagram of the line extender amplifier section.
Figure 4:
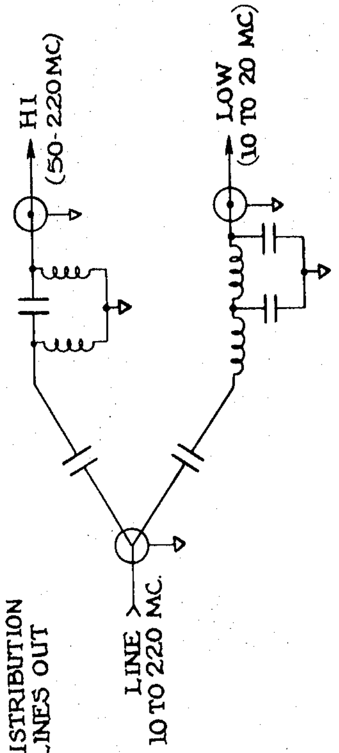
FIG. 4 is a circuit diagram of a band-pass filter of the system.

FIG. 3 illustrates the details of the line extender amplifier sections with the television and command signals on lines 31 (or 31') passing through band-pass filter 41, extender amplifier 42 and band-pass filter 43 to extended distribution lines. Band-pass filters 41 and 43 are also illustrated by the circuit diagram of FIG. 4.

The return signals from subscriber units 200 consist of a 12 megacycle RF carrier, modulated by an audio tone. These signals will be bypassed around any extender amplifiers 42 in their path by passing directly from band-pass filter 43 to filter 41 through connection 44 as shown in FIG. 3. When the return signal reaches the trunk amplifier section 20 (or 20') it is bypassed around trunk amplifier 23 through band-pass filter 24 or 25 and subchannel amplifier 26 which amplifies the signal before passing it through band-pass filter 22 to be mixed into the trunk line 13. After being mixed into the trunk line 13, the return signal is then fed to the command console 100 through directional coupler 12.

Figure 5:
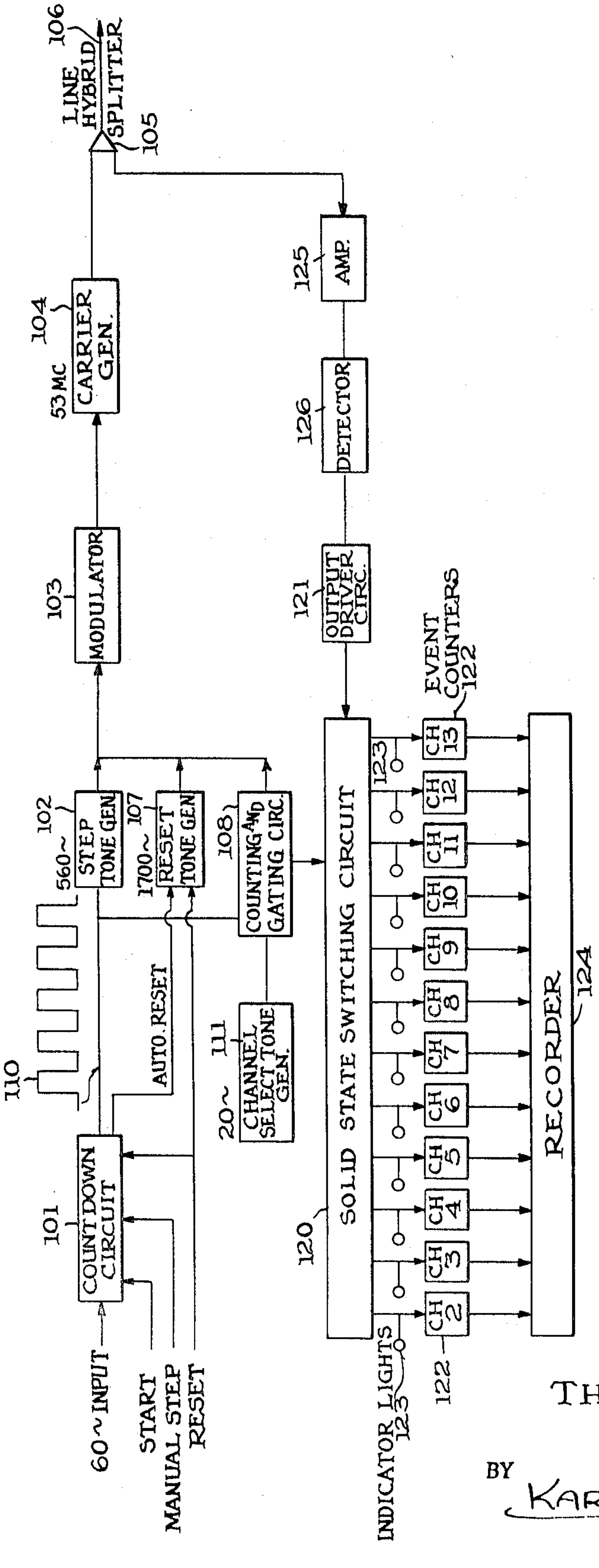
FIGS. 5 and 6 are block diagrams of one embodiment of a command console and subscriber unit portions respectively used in the system of the present invention.
Figure 6:
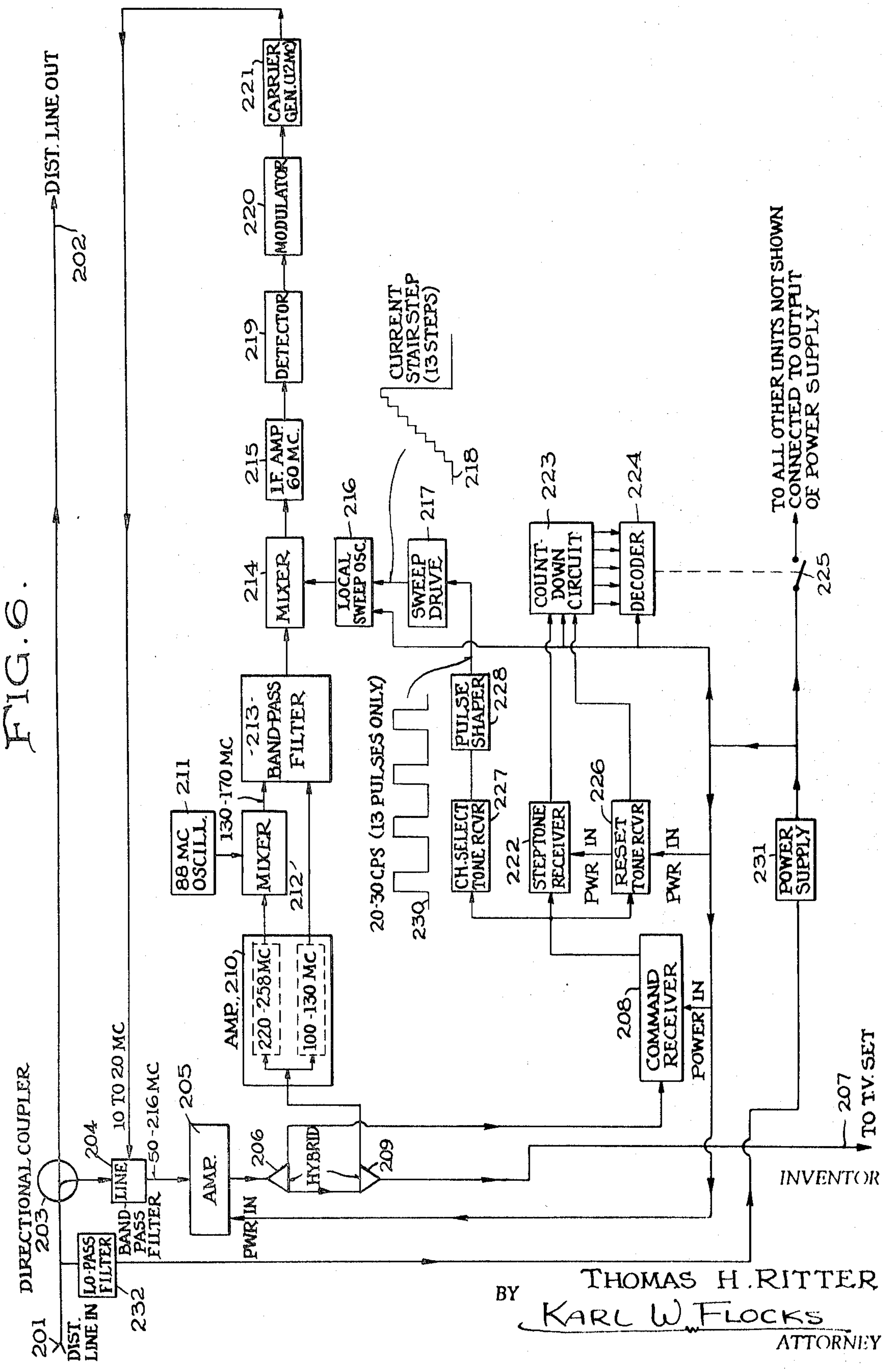

One embodiment of command console 100 and subscriber unit 200 of the CATV system of FIG. 1 is shown in FIGS. 5 and 6 respectively.

In the embodiment of a command console illustrated in FIG. 5 a low voltage 60 cycle input to the countdown circuit 101 is shaped, then counted down to provide a primary (or step) output of 1 pulse per second, with approximately 3 volts peak to peak amplitude. A second counter in circuit 101 is then used to count the number of pulses in the output of the primary portion of circuit 101 and give a secondary (or automatic reset) after a predetermined number of pulses have been sent from the primary portion of circuit 101.

The primary, or step output, of the countdown circuit 101 is fed to a step tone generator 102 and gates it "on" during the positive portion of the input waveform. The overall result is that during the first half of each pulse period, the step tone gives a ½-second burst of a 560 cycle audio tone. This tone is then modulated by means of modulator 103 on a 53 megacycle RF carrier from carrier generator 104 and fed through a hybrid splitter 105 to external line 106, leading to directional coupler 12, trunk line 13 and finally to subscriber units 200.

The secondary, or automatic reset output, of countdown circuit 101 is fed to reset tone generator 107 and gates it "on" for a ½-second period. This output is then used to modulate by means of modulator 103 the 53 megacycle of RF carrier generator 104 and as above is fed through the external lines to subscriber units 200. This signal is used in subscriber units 200 to reset the counter circuits therein. The primary output of countdown circuit 101 is also fed to counting and gating circuit 108. The input leading edge of each of pulses 110 will permit the output of channel select tone generator 111 to pass through to modulator 103, carrier generator 104, and out to line 106 and the external system. The counting and gating circuit 108 will also count the number of cycles that channel select tone generator 111 passes. It will pass 13 cycles of a signal, i.e. a 20 cycle signal, and then shut off. Each successive cycle of this signal, will cause a sweep oscillator of the active subscriber unit 200 to step to a different discrete frequency. Each of these steps will permit the subscriber unit 200 to determine if the customer's television set is tuned to a particular channel. This permits checking for a signal on each of the 12 VHF channels, and using the 13th step for an "off" position.

A second output of the counting and gating circuit 108 feeds to a solid state switching circuit 120, which allows it to step in synchronism with the sweep oscillator 216 of subscriber unit 200. This will connect the output driver circuit 121 to the correct event counter 122, pilot light 123 and recorder 124 channel. The overall result, is that when a 12 megacycle return signal is received, amplified and detected by amplifier 125 and detector 126 respectively, it will be switched to the proper output channel to indicate the channel to which the customer's television set is tuned.

Each of the 12 outputs of solid state switching circuit 120 will, when activated, momentarily turn on a channel indicator light 123, advance the readout of the electromechanical event counter 122 one count, and furnish an input to the multichannel recorder 124. The recorder 124 and the electromechanical event counters 122 utilized are of well-known structure.

A subscriber unit 200 which acts in conjunction with the embodiment of the command console 100 of FIG. 5 is shown in FIG. 6. This unit is designed to perform the function of a CATV tap-off unit, as well as detecting to which channel the CATV customer (or customers) receiving their CATV signals through the unit are tuned, and transmitting this information back to the command console 100.

As previously explained, the frequency of the radiation from the local oscillator of the customer's television set can be utilized to determine to which channel the set is tuned. This is the basis of operation of this unit.

The television and command signals enter the subscriber unit from the distribution line input 201, and feed through the unit to the distribution line output 202, with only a small (0.2 to 1 db. nominal) insertion loss. One distribution line can supply television signals to up to 40 individual customers, and it must be understood that there will normally be several subscriber units 200 in series on any one distribution line 31.

A small amount of signal is tapped off of the through line by a directional coupler 203 and fed through a band-pass filter 204 to a low gain amplifier 205. After amplification, the signal is divided in hybrid splitter 206 to provide signals to both the customer's television set input 207 and the command receiver 208.

The local oscillator radiation from the customer's television set is coupled into the subscriber unit by the same line 207 that supplies the television signals. A chart listing the discrete frequencies which are radiated by the local oscillator of the customer's television set as it is tuned to different channels is as follows:

| Channel | Local Oscillator Frequency (mc.) | Converted Frequency (mc.) | Sweep Local Oscillator (mc.) |
|---|---|---|---|
| 2 | 101 | — | 161/41 |
| 3 | 107 | — | 167/47 |
| 4 | 113 | — | 173/53 |
| 5 | 123 | — | 183/63 |
| 6 | 129 | — | 189/69 |
| 7 | 221 | 133 | 193/73 |
| 8 | 227 | 139 | 199/79 |
| 9 | 233 | 145 | 205/85 |
| 10 | 239 | 151 | 211/91 |
| 11 | 245 | 157 | 217/97 |
| 12 | 251 | 163 | 223/103 |
| 13 | 257 | 169 | 229/108 |

The above chart also lists other frequencies associated with the local oscillator frequencies which will be discussed.

The radiated signal from the local oscillator is fed back on line 207 through hybrid splitter 209 to the input of amplifier 210. This is a split band amplifier, with one part handling the local oscillator radiation signals from the low band only over a range of 100 to 130 mc., while the other part handles that from the high band over a range of 220 to 258 mc.

Since there is considerable difference in frequency between the high- and low-band signals, the high-band signals are converted to a lower frequency band just above the low-band signals. This frequency conversion is accomplished by mixing the high-band signals with the output of an 88 megacycle oscillator 211, in a mixer 212. The low band output of amplifier 210 is combined with the mixer 212 output in band-pass filter 213, and fed to the input of a second mixer 214. Since the input to this mixer 214 can be any discrete frequency listed in the above chart for the low-band channels or the converted frequencies for the high-band channels, the input to mixer 214 will be between 101 and 169 megacycles. In order to convert this to the 60 megacycles required for the IF amplifier 215, the sweep local oscillator 216 must supply a signal between 41 and 109 megacycles as listed in the last column of the chart. In operation, the sweep drive circuit 217 will supply a modified current stairstep signal 218 to the sweep local oscillator 216 to set the oscillator at the frequencies listed in the chart. Since these frequencies are stepped through in sequence, it is in effect a check to see if there is an input to mixer 214 due to local oscillator radiation from the customer's television set, first on channel 2, then channel 3, and so on, through channel 13. A 13th step will return the local oscillator to a "Resting" or "off" frequency below 41 megacycles.

In the case discussed, the sweep oscillator is operated 60 megacycles below the incoming carriers. It would be just as possible under some circumstances to operate the sweep oscillator 60 megacycles above the incoming carriers in the range of 161 to 229 mc., as shown as alternative values in the last column of the above chart. It is possible to operate this system with the IF amplifier 215 tuned to frequencies other than 60 megacycles. This frequency was chosen for purposes of explanation, but the overall system is not restricted to operation with only one specific IF frequency. Any change of IF frequency would, however, cause the frequency of the sweep local oscillator 216 to also be changed.

An output from the IF amplifier 215 at any sweep local oscillator 216 step will be an indication that the customer is tuned to the corresponding channel. This output will be detected in detector 219 and through modulator 220 used to modulate a 12 megacycle carrier generator 221. The output of this 12 megacycle carrier generator 221 is fed into band-pass filter 204 through directional coupler 203 and back out of the distribution line input 201 over the external CATV system to the command console 100. At the command console 100, the time that a return signal is received will indicate in effect to which station the customer connected to the active subscriber unit has his television set tuned.

In the subscriber unit 200 of FIG. 6 the signal at the input of command receiver 208 consists of a 53 megacycle carrier, modulated by audio tones received from command console 100. Three different audio modulation tones are used. They are a step tone (560c.p.s.), a reset tone (1,700c.p.s.), and a channel select tone (20 c.p.s.).

The step tone is passed through a step tone receiver 222 to a countdown circuit 223. Each burst of tones will step the binary counter in countdown circuit 223 to the next count. When the count reaches a predetermined state, to which a decoder 224 has been set to respond, the decoder output turns power on through closing of a switch 225 to all remaining subscriber unit components. Prior to this "turn-on" the subscriber unit 200 has been operating with power on a minimum number of components. This "turn-on" in effect changes the subscriber unit 200 from a passive to active condition. In an operating system, decoders 224 will be set so that only one subscriber unit 200 will be active at any one time. In this manner a command console 100 will be able to interrogate each individual subscriber unit 200, shifting from one to the next with each step tone.

The reset tone is passed through a reset tone receiver 226 to countdown circuit 223, and resets all counters to the starting condition. A reset tone will be transmitted from command console 100 prior to the start of each interrogation sequence.

The channel select tone is passed through a channel select tone receiver 227 to a pulse shaper 228. Pulse shaper 228 will change each cycle of the 20 cycle channel select tone to a pulse. This train 230 of 13 pulses will be fed to sweep drive unit 217 to control the stepping of sweep local oscillator 216 to each of its discrete steps.

Power supply 231 receives a 20 to 30 volt, 60 cycle, AC input from the distribution line input 201 through low-pass filter 232. Since it is common practice in the CATV industry to carry this AC power on the distribution lines for powering line extender amplifiers 42, it may also be utilized for supplying power to the subscriber units. The power supply 231 is convention in design, and requires no specific discussion.

Figure 7:
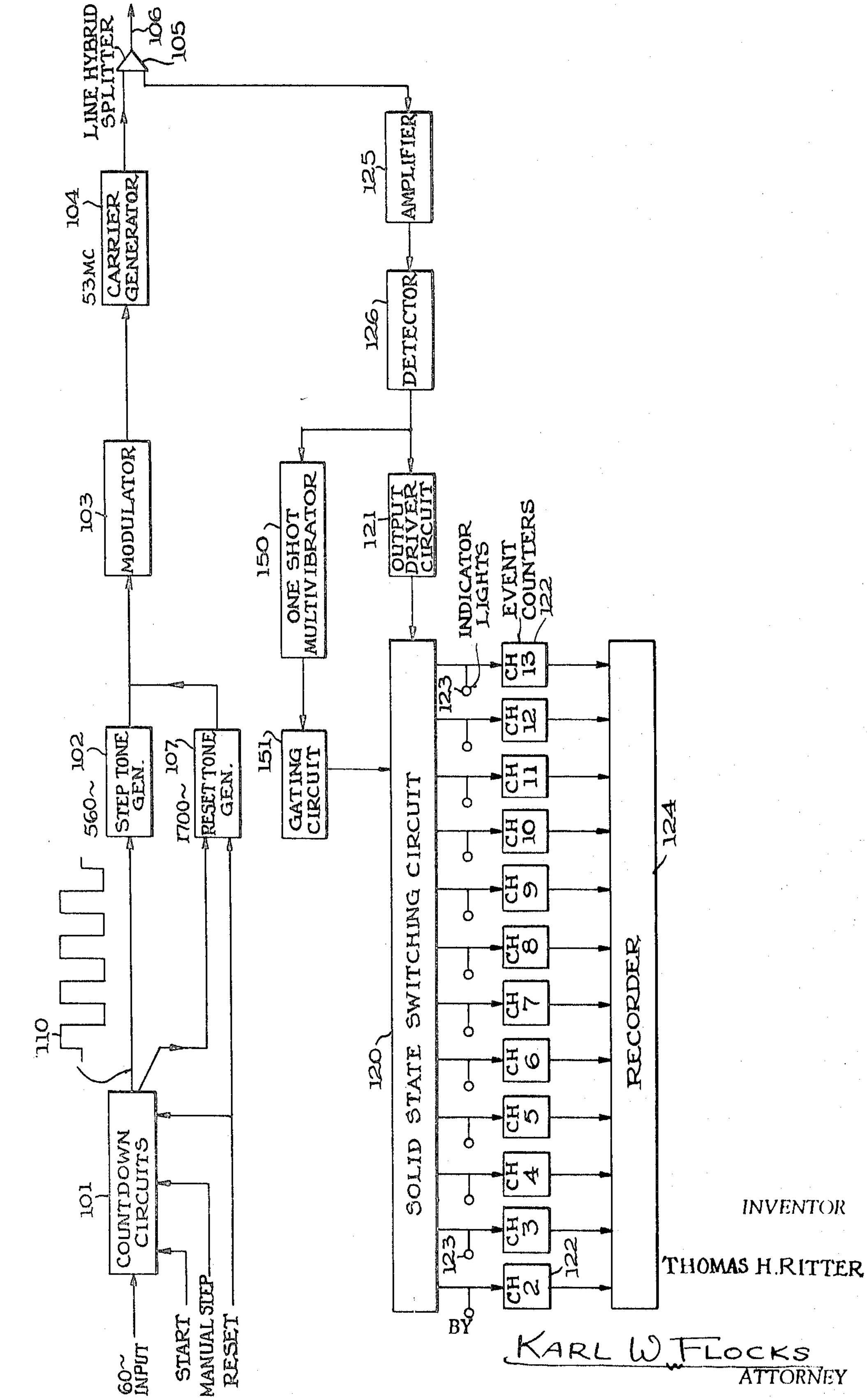
FIGS. 7 and 8 are block diagrams of second embodiments of a command console and subscriber unit portions respectively used in the system of the present invention.
Figure 8:
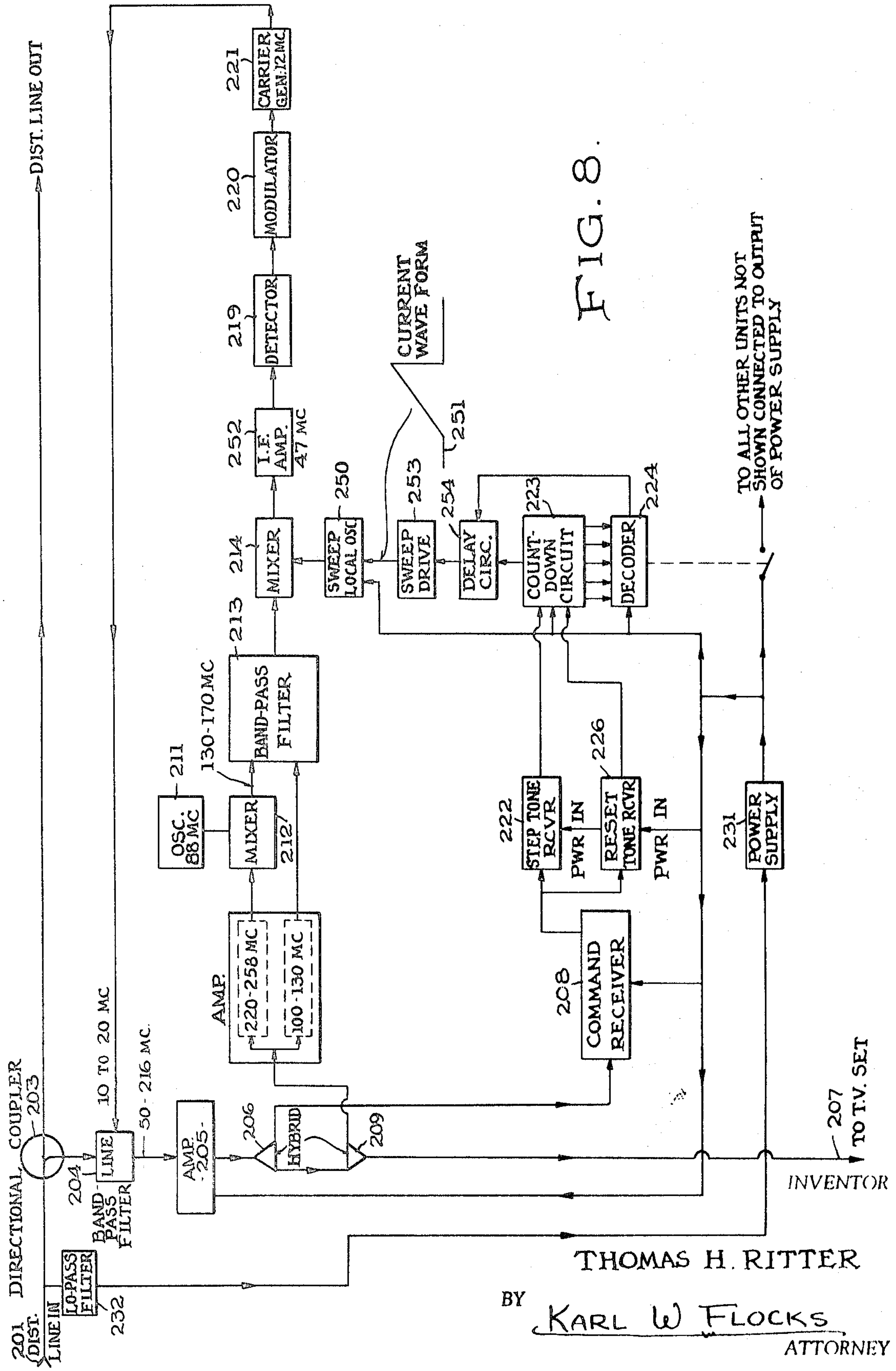

The purpose of the embodiment of command console 100 and subscriber unit 200 shown in FIGS. 7 and 8 respectively is the same as that of FIGS. 5 and 6, however the overall objective is accomplished in a slightly different manner. The principle change is that solid state switching circuit 120 now switches the signal from the output driver circuit 121 to the individual output channels at a specific time after receipt of a time reference pulse.

This time reference pulse is developed in the subscriber unit, as the sweep local oscillator 250 crosses the IF frequency of 47 megacycles. Any other return signals from the subscriber unit 200 of FIG. 8 are due to the presence of a signal received from the local oscillator of the customer's television set. The channel to which the customer's television set is tuned will be determined by the elapsed time between the time reference pulse and the signal pulse.

Receipt of the first, or time reference signal at the output of the detector 126 will be passed through the output driver circuit 121, but it alone will not activate any outputs of the solid state switching circuit 120 since no outputs are gated "on". The time reference signal out of the detector 126 is also applied to a one shot multivibrator 150, which will enable the gating circuit 151 to turn on the outputs of the solid state switching circuit 120 one at a time, in sequence. Delay or timing circuits, built into the gating circuit 151, will time it so that a return signal will be switched to the proper output channel of the solid state switching circuit 120 at the same time that sweep local oscillator 250 in the subscriber unit is passing the correct frequency.

In the subscriber unit of FIG. 8 the basic changes from the unit of FIG. 6 are that sweep local oscillator 250 is now driven by sawtooth current waveform 251 instead of a stairstep waveform 218 used to drive local sweep oscillator 216 of the unit of FIG. 6. Also, the IF amplifier frequency of IF amplifier 252 is 47 megacycles instead of 60 megacycles as for IF amplifier 215.

The operation of the majority of the components of the subscriber unit of FIG. 8 is as previously discussed for the subscriber unit of FIG. 6 and will not be discussed again. Only those components having different functions will be discussed.

This embodiment does not utilize a channel select tone receiver 227 and pulse shaper 228 to activate the sweep drive unit 253, as was used with sweep drive unit 217. In this case, following activation of the subscriber unit by the decoder 224, power is turned on to all units. After a delay of approximately 5 milliseconds, delay circuit 254 will initiate sweep drive 253. Sweep local oscillator 250 will be normally at rest at 40 megacycles, and the rising current sawtooth 251 will slowly (in about 0.75 second) increase the frequency of the sweep local oscillator 250 through the frequency range of 54 to 122 megacycles instead of the range of 41 to 109 megacycles as on the chart previously included in the specification. As the sweep local oscillator 250 crosses 47 megacycles, an output from the IF amplifier 252 will modulate the 12 megacycle carrier generator 221. The signal, after being received by the command console of FIG. 7, will serve as a time reference. Since the sweep local oscillator 250, after starting, changes frequency at a known rate, the time a second response is delayed from the time reference is used to determine to which channel the customer's television set is tuned.

FIGS. 6 and 8 show subscriber units 200 in a configuration to serve a single customer. FIG. 9 shows a modification of the configuration to serve four separate customers. This would most likely be the more frequently used configuration. This technique can also be utilized to serve any number of customers who can conveniently be served from a single subscriber unit.

Additional to previous circuitry, there have been added a four-way hybrid splitter 260 and a solid state switching unit 261. Also a single two-way hybrid splitter 209 has been replaced by a total of four splitters 209′, with connections made as shown. Connection 262 in dashed form is used to designate a connection with all components previously discussed between command receiver 208 and decoder 224.

FIGS. 10 through 12 illustrate a further embodiment of command console 100, in FIG. 11, and a subscriber unit 200 in FIG. 12 with a modification to trunk amplifier section 20 shown in FIG. 10 for use with this embodiment.

In this embodiment the command signals sent from command console 100 to all of subscriber units 200 and their return signals are audio tones instead of modulated RF signals. Upon activation of the command console, countdown circuits 301 are activated, which applies 0.5 second pulses at a 60 cycle pulse rate frequency to step tone generator 302. This audio generator has an audio output consisting of a series of 0.5 second bursts of a 400 cycle tone, repeated every second. The system automatically sends a reset tone and shuts off after a predetermined number of steps have been counted.

The audio step tones from step tone generator 302 are amplified in audio amplifier 305 and mixed with the television signals in mixing unit 312 and fed down trunk line 313 to a trunk amplifier section 320. In trunk amplifier section 320, television signals pass through the trunk amplifier 23 and distribution amplifier 21 as discussed with previous embodiments but the audio tone passes through audio pass filter 322 to the desired trunk or distribution amplifier output line or lines. The audio tone then passes through hybrid splitter 30, passing unmonitored television tap-off units until reaching a subscriber unit 200.

In the subscriber unit, the audio signal is separated from the television signals in mixing unit 403, and applied to the input of the step and reset tone receivers 405 and 406 respectively. Reception of a step tone gives an output to a counter 407. The overall effect is that counter 407 is then stepped through its range in synchronism with the counter in countdown circuits 301 in the command console. The counter 407 is connected to the decoder and buffer 408 in such a way that it furnishes an output gate pulse to the readout tone generators 410, only at one unique step position. In a complete system, one and only one, subscriber unit would be activated on each step of the counter of countdown circuits 301. The gate pulse out of the decoder 408, effectively permits any of the readout tone generators 410 to operate if they are activated by their individual detector unit 420.

When the television set, which is connected to the subscriber unit is turned on, its local oscillator radiation is coupled through hybrid splitter 433 and on through a high pass filter 430 to the inputs of amplifiers 431 and 432 by means of hybrid splitter 434. This local oscillator signal will pass through and be amplified by one of the amplifiers. If it is a signal derived from a low-band television channel, it will go through a splitter 435 to the low-band detector units 42. If it is a high-band signal, it will be converted to a lower frequency before arriving at the high-band detector units 420 by passing through splitter 436 and one of converters 440. In either case, receipt of a signal of the proper frequency, by any detector unit 420 will activate its associated tone generator 410 if the tone generator 410 has its "on gate" applied. This will happen only at the unique step which decoder 408 is set up to receive. It should be noted that tone generators 410, detector units 420 and converters 440 each are of a group of individual units handling different frequencies and do not include all of the number of units used in this system. More units than those illustrated may be used to cover channels not shown.

Any readout tones generated will pass back to the command console over the same lines used by the step tones. These tones will be detected by the associated tone receivers 310 in the command console, and will activate the channel indicator light 320 and event counter 330 through relay and driver circuit 340.

In a complete system, the overall operation permits the interrogation of one customer's set, the receiving and recording of the channel being watched, and the interrogation of the other sets in their turn as with the previous embodiments.

It will be obvious to those skilled in the art that various changes may be made without departing from the scope of the invention and the invention is not to be considered limited to what is shown in the drawings and described in the specification.

What is claimed is:

1. A community antenna television system delivering television signals to a plurality of television receivers comprising
television signal receiving and distributing equipment to apply the television signals to the system:
a plurality of television receivers each adapted to receive a plurality of different channels;
trunk line means connected to said television signal receiving and distributing equipment,
amplifier means connected to said trunk line means at a point away from said connection to said television signal receiving and distributing equipment,
and branch distributing line means connected to said amplifier means and extending therefrom;
monitoring means connected between said branch distributing line means and selected ones of said plurality of television receivers to have their channel use monitored;
interrogating means for interrogating and obtaining information from said monitoring means connected to said trunk line means through a coupling means;
and band-pass filter means to divert signals of selected frequencies in said trunk line means and said branch distributing line means around said amplifier means;
said interrogating means including
a pulse counting circuit, a step tone generator means to generate an audio signal of a first frequency connected to and activated by pulses from said pulse counting circuit, a reset tone generator means to generate an audio signal of a second frequency connected to and activated by pulses from said pulse counting circuit, tone receiving means for each television channel being monitored on said selected ones of said plurality of television receivers, and counting means connected to each of said tone receiving means and activated therefrom;

said monitoring means including a cable connection between said monitoring means and said selected television receiver to send television signals to said television receiver and also to receive local oscillator radiation signals from said television receiver, detector means for each television channel being monitored on said television receiver connected to said cable connection, frequency converter means connected between said cable connection and said detector means for each of said detector means for detecting television channels on the upper side of the range of channel frequencies in order to convert those frequencies to lower frequencies closer to the lower side of the range of channel frequencies, a tone generator connected to each of said detector means, for generating audio tones of different frequencies and connected to said tone receiving means, receiving means connected to receive said first and second audio signals from said step and reset tone generator means in said interrogating means, counter means connected between said receiving means and said tone generators and operating with a said detector means to activate the one of said tone generators connected to said detector means to send an audio signal through said connection thereto to the one of said tone receiving means in said interrogating means adjusted to receive that frequency of audio signal.

2. A community antenna television system delivering television signals to a plurality of television receivers comprising television signal receiving and distributing equipment to apply the television signals to the system:

a plurality of television receivers each adapted to receive a plurality of different channels;

trunk line means connected to said television signal receiving and distributing equipment, amplifier means connected to said trunk line means at a point away from said connection to said television signal receiving and distributing equipment, and branch distributing line means connected to said amplifier means and extending therefrom;

monitoring means connected between said branch distributing line means and selected ones of said plurality of television receivers to have their channel use monitored;

interrogating means for interrogating and obtaining information from said monitoring means connected to said trunk line means through a coupling means;

and band-pass filter means to divert signals of selected frequencies in said trunk line means and said branch distributing line means around said amplifier means;

said monitoring means including means to detect and modulate a signal on a carrier wave, connected to said branch distributing line means, a sweep oscillator generating signals of frequencies associated with each of said different channels received by said television receiver, drive means to control said sweep oscillator connected to said sweep oscillator, receiver means connected to said branch distributing means to said interrogating means and controlled by said interrogating means and connected to said drive means to control the current waveform from said drive means to said sweep oscillator, and mixing means connected to receive signals from said sweep oscillator and said connected television receiver and deliver the mixed signal to said means to detect and modulate a signal.

3. The system of claim 2 further characterized by the waveform of the current from said drive means to control said sweep oscillator being of stairstep shape.

4. The system of claim 2 further characterized by the waveform of the current from said drive means to control said sweep oscillator being a sawtooth wave.

5. A community antenna television system delivering television signals to a plurality of television receivers comprising television signal receiving and distributing equipment to apply the television signals to the system;

a plurality of television receivers each adapted to receive a plurality of different channels;

trunk line means connected to said television signal receiving and distributing equipment, amplifier means connected to said trunk line means at a point away from said connection to said television signal receiving and distributing equipment, and branch distributing line means connected to said amplifier means and extending therefrom;

monitoring means connected between said branch distributing line means and selected ones of said plurality of television receivers to have their channel use monitored;

interrogating means for interrogating and obtaining information from said monitoring means connected to said trunk line means through a coupling means;

and band-pass filter means to divert signals of selected frequencies in said trunk line means and said branch distributing line means around said amplifier means;

said interrogating means including means to modulate a radio frequency carrier with an audio frequency signal and connection of said means to said trunk line means to control operation of said monitoring means, counting and gating circuit means to control output of said means to modulate a radio frequency carrier, and switching means receiving signals from said monitoring means and synchronized with said monitoring means by said counting and gating circuit means.

6. A community antenna television system delivering television signals to a plurality of television receivers comprising television signal receiving and distributing equipment to apply the television signals to the system;

a plurality of television receivers each adapted to receive a plurality of different channels;

trunk line means connected to said television signal receiving and distributing equipment, amplifier means connected to said trunk line means at a point away from said connection to said television signal receiving and distributing equipment, and branch distributing line means connected to said amplifier means and extending therefrom;

monitoring means connected between said branch distributing line means and selected ones of said plurality of television receivers to have their channel use monitored;

interrogating means for interrogating and obtaining information from said monitoring means connected to said trunk line means through a coupling means;

and band-pass filter means to divert signals of selected frequencies in said trunk line means and said branch distributing line means around said amplifier means;

said interrogating means including means to modulate a radio frequency carrier with an audio frequency signal and connection of said means to said trunk line means to control operation of said monitoring means, multivibrator means and switching means connected to each other through gating means and to receive signals from said monitoring means, said switch means synchronized with said monitoring means by timed reference signals from said monitoring means applied to both said multivibrator means to operate said gating means, and to said switching means.

* * * * *